United States Patent
Ouyang et al.

(10) Patent No.: US 10,757,312 B2
(45) Date of Patent: Aug. 25, 2020

(54) METHOD FOR IMAGE-PROCESSING AND MOBILE TERMINAL USING DUAL CAMERAS

(71) Applicant: GUANGDONG OPPO MOBILE TELECOMMUNICATIONS CORP., LTD., Dongguan, Guangdong (CN)

(72) Inventors: Dan Ouyang, Guangdong (CN); Guohui Tan, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 56 days.

(21) Appl. No.: 15/999,289

(22) Filed: Aug. 16, 2018

(65) Prior Publication Data

US 2019/0130533 A1 May 2, 2019

(30) Foreign Application Priority Data

Nov. 1, 2017 (CN) .......................... 2017 1 1060116

(51) Int. Cl.
*H04N 5/225* (2006.01)
*H04N 5/232* (2006.01)

(52) U.S. Cl.
CPC ....... *H04N 5/2258* (2013.01); *H04N 5/23229* (2013.01)

(58) Field of Classification Search
None
See application file for complete search history.

(56) References Cited

U.S. PATENT DOCUMENTS

| 2014/0071330 A1* | 3/2014 | Zhang .................. H04N 5/2258 348/345 |
| 2016/0080653 A1 | 3/2016 | Kim et al. |
| 2016/0080654 A1 | 3/2016 | Chang et al. |

(Continued)

FOREIGN PATENT DOCUMENTS

| CN | 104253939 A | 12/2014 |
| CN | 104333700 A | 2/2015 |

(Continued)

OTHER PUBLICATIONS

European search report for Application No. EP18188910.6, dated Mar. 6, 2019 (12 pages).

(Continued)

*Primary Examiner* — Justin P. Misleh
(74) *Attorney, Agent, or Firm* — Ladas & Parry LLP

(57) ABSTRACT

A method for image processing and a mobile terminal, and a computer readable medium are disclosed. In one method, n number of first images and m number of second images are acquired. The first images and the second images are captured by a primary camera and a secondary camera respectively, and both the n and the m are integers greater than 2. A synthesizing-denoising process is performed on the n number of first images and the m number of second images respectively to obtain a primary image and a secondary image respectively. Depth information of the primary image is obtained based on the primary image and the secondary image. A blurring process for the primary image is then performed based on the depth information of the primary image to obtain a target image.

17 Claims, 7 Drawing Sheets

(56) References Cited

U.S. PATENT DOCUMENTS

| | | | |
|---|---|---|---|
| 2017/0006277 A1 | 1/2017 | D'Amico et al. | |
| 2017/0019616 A1 | 1/2017 | Zhu et al. | |
| 2017/0310901 A1* | 10/2017 | Sheikh | H04N 5/23296 |
| 2018/0070023 A1* | 3/2018 | Oh | G06T 7/55 |
| 2019/0014275 A1* | 1/2019 | Zhang | H04N 5/232 |
| 2019/0073749 A1* | 3/2019 | Lin | G06T 5/002 |
| 2019/0104258 A1* | 4/2019 | Cohen | H04N 5/2621 |

FOREIGN PATENT DOCUMENTS

| | | |
|---|---|---|
| CN | 105100615 A | 11/2015 |
| CN | 105763813 A | 7/2016 |
| CN | 106127698 A | 11/2016 |
| CN | 106960413 A | 7/2017 |
| CN | 107085825 A | 8/2017 |
| CN | 107948500 A | 4/2018 |
| CN | 107959778 A | 4/2018 |
| EP | 3099044 A1 | 11/2016 |
| TW | 201611598 A | 3/2016 |

OTHER PUBLICATIONS

First Office Action from China patent office in a counterpart Chinese patent Application 201711060116.4, dated May 20, 2019 (11 pages).

Anonymous: "Digital Bokeh—The Look & Feel of a Professional Camera.", Sep. 13, 2017, one page, retrieved from the internet: URL:https://web.archive.org/web/20170913081217/http://corephotonics.com/products/digital-bokeh/.

Samuel W. Hasinoff et al., "Burst Photography for high dynamic range and low-light imaging on mobile cameras", ACM Transactions on Graphics, vol. 35, no. 6, Nov. 11, 2016, pp. 1-12.

International Search Report and Written Opinion issued in corresponding international application No. PCT/CN2018101806, dated Nov. 13, 2018 (11 pages).

Second Office Action from the China Patent Office in counterpart Chinese Patent Application No. 201711060116.4, dated Oct. 29, 2019 (29 pages).

Honghua Hou, Image fusion, Digital Image Processing and Analysis Sep. 30, 2011, p. 233-238.

* cited by examiner

METHOD FOR IMAGE-PROCESSING AND MOBILE TERMINAL USING DUAL CAMERAS

CROSS-REFERENCE TO RELATED APPLICATIONS

This application claims priorities to Chinese Patent Application No. 201711060116.4, filed on Nov. 1, 2017, the contents of which are herein incorporated by reference in its entirety.

TECHNICAL FIELD

The present disclosure generally relates to the technical field of mobile terminal, and in particular relates to a method for image-processing and a mobile terminal using dual cameras.

BACKGROUND

For a mobile terminal, it usually cannot achieve a blurring effect of the background in an optical mode due to the limitation of its size. In order to blurring-process the background of an image, in an existing technology, two cameras may be adopted to capture a photo respectively. One of the two photo is selected as the imaging photo, and depth information of the imaging photo is calculated based on the other of the photo. Then, a blurring process is performed for the background of the imaging photo according to the depth information.

However, in the case of dark light environment, the imaging effect of the imaging photo is poor, and meanwhile the depth information is not accurate enough, resulting in poor effect of the blurring-processed photo.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Figure 1:
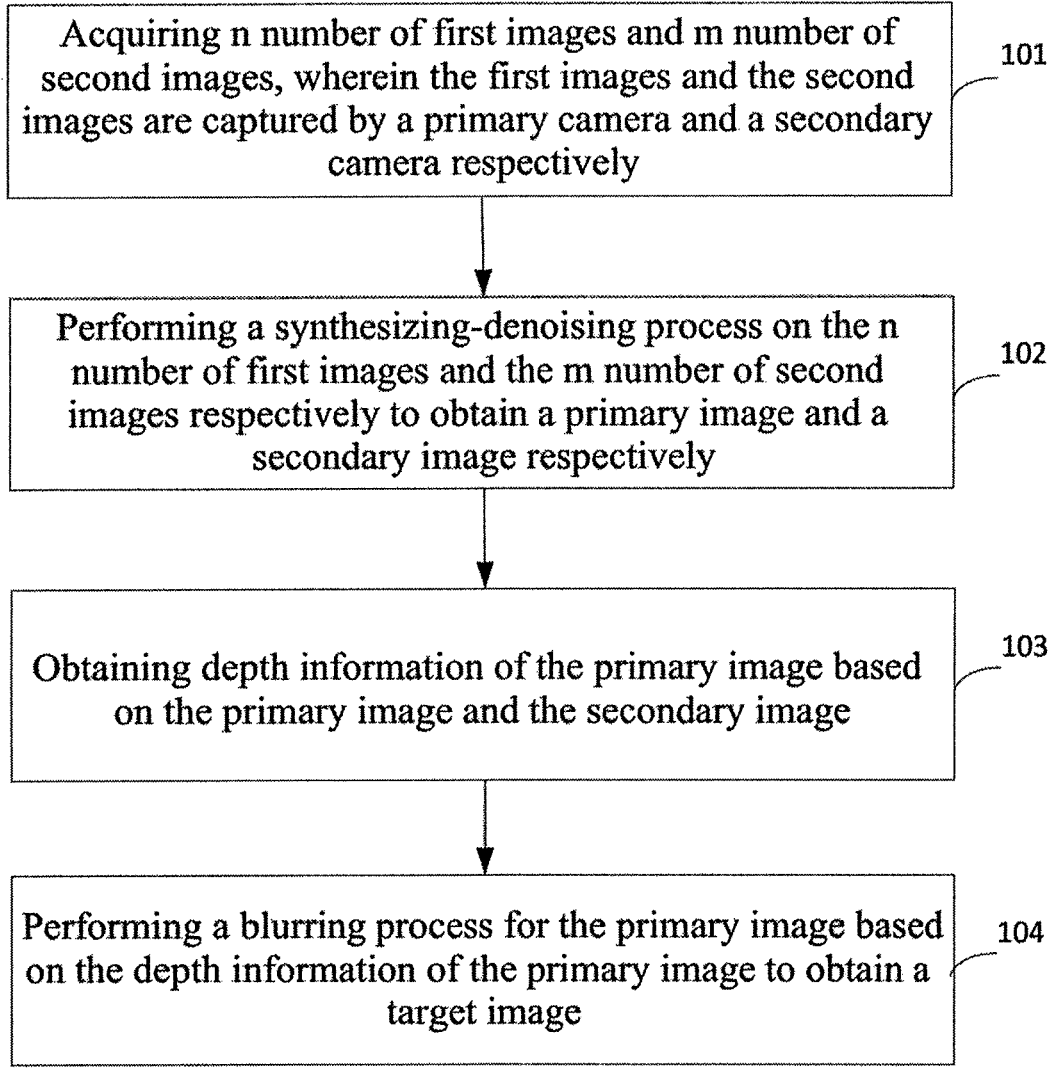
FIG. 1 is a flow chart of a method for image-processing according to an embodiment of the present disclosure.

The following embodiments of the disclosure will be described in detail, examples of which are shown in the accompanying drawings, in which the same or similar reference numerals have been used throughout to denote the same or similar elements or elements serving the same or similar functions. The embodiments described below with reference to the accompanying drawings are exemplary only, meaning they are intended to be illustrative of rather than limiting the disclosure.

In the following, a method for image-processing and a mobile terminal provided in embodiments of the present disclosure will be described with reference to drawings.

The method for image-processing in embodiments of the present disclosure may be implemented by a hardware apparatus with dual cameras, such as, mobile phone, table PC, personal digital assistant, wearable equipment, etc. The wearable equipment may be smart bracelet, smart watch, smart glasses, etc.

FIG. 1 is a flow chart of a method for image-processing according to an embodiment of the present disclosure. As shown in FIG. 1, the method for image-processing may include the following blocks.

At block 101, n number of first images and m number of second images are acquired, wherein the first images and the second images are captured by a primary camera and a secondary camera respectively. Both n and m are integers greater than 2.

In this embodiment of the present disclosure, the imaging quality may be improved by performing a synthesizing-denoising process on the first images and the second images respectively. In an actual application, since the imaging effect of the dual cameras is bad under an environment of low-light, there is much noise in the captured first images and second images. Under an environment of high-light, the imaging effect of the dual cameras is excellent due to sufficient lights. The values of n and m may be adjusted based on the imaging performance of the dual cameras under different environments. For example, the values of n and m are adjusted to be large under the environment of low-light, such that the imaging effect is improved as much as possible. Additionally, the values of n and m are adjusted to be small under the environment of high-light, in order to reduce the processing pressure of the whole system when the imaging effect is ensured to be excellent.

In one embodiment of the present disclosure, brightness of ambient light may be obtained, under which a shooting operation is detected. For example, the brightness of ambient light may be obtained by an optical sensor in the hardware apparatus with the dual cameras. As a further example, the brightness of ambient light may be obtained according to ISO (International Standards Organization) sensitivity values of the dual cameras. If the obtained brightness of ambient light is located at a range, corresponding values of n and m can be found, for example, in a lookup table, which defines a relationship between the brightness of ambient light and the values of n and m. Thus, the primary camera and the secondary camera is controlled to capture n number of first images and m number of second images, respectively.

The values of n and m corresponding to various ranges of the brightness of ambient light may be calibrated from much test data. During a test, after a synthesizing-denoising process is performed on each n number of first images and m number of second images respectively, different imaging effects and different processing time for different values of n and m are tested, where each pair of n and m corresponds to each range of the brightness of ambient light. Certain values of n and m for the optimal imaging effect may be obtained when a preset processing time is met. Then a relationship between the values of n and m for the optimal imaging effect and the corresponding range of the brightness of ambient light may be established.

It is noted that the values of n and m may also be related to an imaging hardware of the hardware apparatus with the dual cameras. The better sensitivity the imaging hardware has, the smaller the values of n and m are.

At block 102, a synthesizing-denoising process is performed on the n first images to obtain a primary image and on the m second images to obtain a secondary image.

In an embodiment, the synthesizing-denoising process is performed with a denoising algorithm on the n first images to obtain the primary image and on the m second images to obtain the secondary image. The denoising algorithm described herein may be a non-local means denoising algorithm, and of course, may be one of other denoising algorithms, which is not limited in this embodiment.

To distinctly understand the synthesizing-denoising process for multiple frames, it will describe the synthesizing-denoising process for multiple frames.

When it is under an environment of low-light, an imaging device, such as a terminal device, generally adopts a mode of auto-improving the sensitivity thereof to shoot, but this mode will cause the images with many noisy points. The synthesizing-denoising process for multiple frames is configured to reduce the noisy points of the images, for improving the image quality shot in a high sensitivity condition. The principle thereof is in that the noisy points are unorderedly arranged which are well known. In detail, after capturing a plurality of images continuously, noisy points at a same location may be a red noisy point, a green noisy point, or a white noisy point; specifically, no noisy point exists at the same location. Therefore, a comparing and filtering condition are given to filter pixel points which belongs to noise (noisy points) according to a value of each pixel point corresponding to a same location in the plurality of captured images, after the plurality of images is registered. Furthermore, after filtering the noisy points, an algorithm may be further adopted to perform a color-speculating and pixel-replacing process on the noisy points, for removing the noisy points. After the above processes, denoising effect with low image-quality loss may be achieved.

For example, in a simple method for synthesizing-denoising process for multiple frames, multiple images are captured, and then values of pixel points corresponding to a same location of the plurality of images are read. A weighted-average value of the pixel points is calculated, and then a value of a corresponding pixel point at the same location of a synthesized image is generated. By this way, an image with high definition may be achieved.

There exists one image with highest definition among the images, which may be treated as a base image. As a possible implementation, the weight of the base image may be greater than the weights of other images. In other words, the noise in the base image may be identified and removed with the reference to other images substantively.

At block 103, depth information of the primary image is obtained based on the primary image and the secondary image.

Since there is a certain distance between the primary and secondary cameras, the disparity between these cameras is formed. Thus, the images captured by different cameras shall be different. Both the primary image and the secondary image are obtained by performing synthesizing-denoising process on the images captured by different cameras. Therefore, there shall also be some differences between the primary image and the secondary image. According to the principle of the triangular measurement, depth information of one object may be obtained based on the difference between the object in the primary image and the object in the secondary image, which also is referred to a distance between the object and the plane where the primary and secondary cameras are located. The depth information of the primary image is obtained as depth information of various objects in the primary image is obtained.

The principle of the triangular measurement will be described simply in the following, in order to specify this process clearly.

In an actual scenario, eyes-distinguishing depth information of a scene is based on stereo vision, which is same to the principle for which the dual cameras distinguish the depth information. In this embodiment, a method for obtaining depth information of an image is mainly based on the principle of a triangular measurement. The principle of a triangular measurement is shown in FIG. 2.

Figure 2:
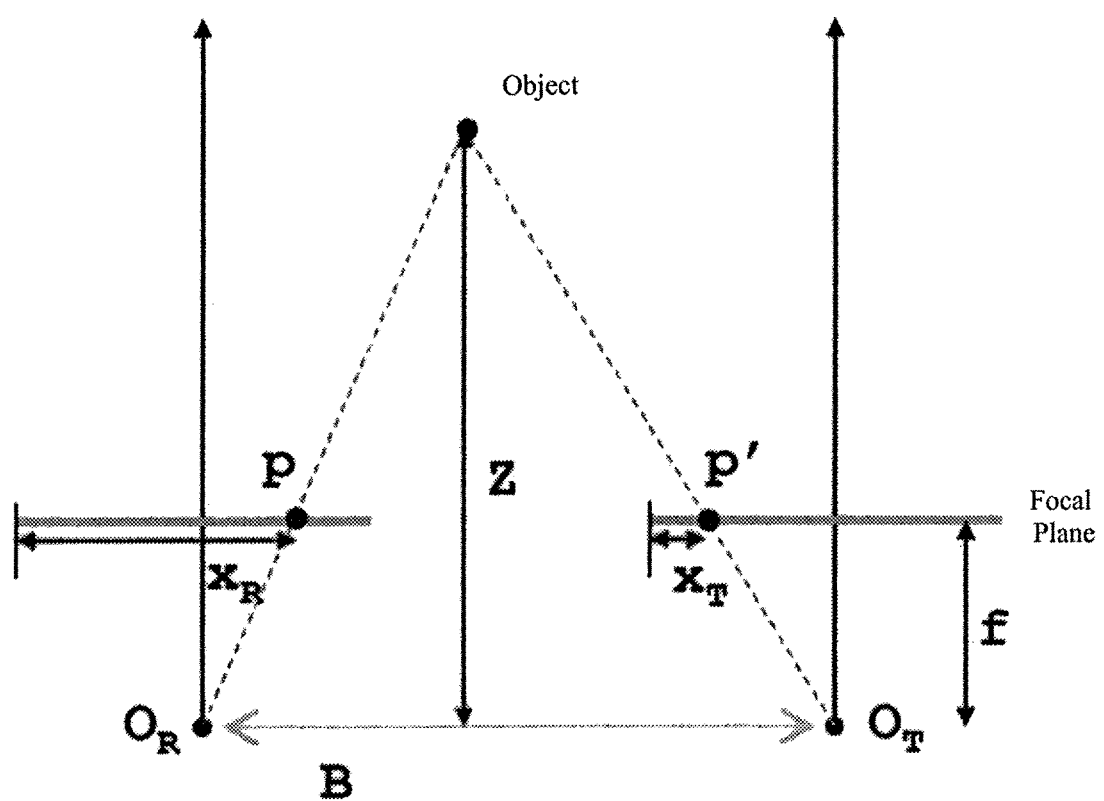
FIG. 2 is a principle schematic view of a triangular measurement.

In FIG. 2, an imaging object, locations $O_R$ and $O_T$ of the dual cameras, and focal planes of the dual cameras are shown in an actual space. The focal planes are spaced from a plane where the dual cameras are located respectively with a distance f, and the dual cameras image at the focal planes respectively to capture two images.

Points P and P' are locations of a same object in the two different captured images. The P point is spaced from a leftmost boundary of an image, where the point P is located, with a distance $X_R$; and the P' point is spaced from a leftmost boundary of another image, where the point P' point is located, with a distance $X_T$. Points $O_R$ and $O_T$ represent two cameras respectively, and the two cameras are arranged on a same plane, and spaced from each other with a distance B.

According to the principle of the triangular measurement, the object as shown in FIG. 2 is spaced from the plane, where these cameras are located, with a distance Z; and the distance Z meets a formula:

$$\frac{B}{Z} = \frac{(B + X_T) - X_R}{Z - f}.$$

Therefore, a formula $$Z = \frac{B \cdot f}{X_R - X_T} = \frac{B \cdot f}{d}$$

may be derived, wherein d is a difference between the locations of the same object in the two different captured images. Since B and f are constant values, thus the distance Z of the object may be determined according to the difference d.

At block 104, a blurring process for the primary image is performed based on the depth information of the primary image to obtain a target image.

In an embodiment, after obtaining depth information of the primary image, a background region and a foreground region are identified on the primary image based on the depth information. For example, whether one object on the primary image belongs to foreground region or background region is determined according to depth information of the object in the primary image. Generally, the depth information of one object indicates that the object is determined to belong to the foreground region, when a depth value for the object is small as the object closes to the plane where the primary and secondary cameras are located. Otherwise, the object may be determined to belong to the foreground region.

In an embodiment, the blurring process may be performed on the background region to obtain the target image. Thus, in the target image, the foreground region is prominent and the background region is blurry, such that the imaging effect for a focal area of the foreground region becomes better and more prominent.

Based on the depth information of the primary image, the blurring process may be performed on the background region of the primary in the following manners.

The depth information of the primary image includes first depth information for the foreground region and second depth information for the background region. In an embodiment, the first depth information for the foreground region and second depth information for the background region are obtained according to the depth information of the primary image and a focal region. A blurring level is calculated based on the first depth information and the second depth information, and then the blurring process with the blurring level is performed on the background region. Thus, different blurring processes with different blurring level may be performed according to different depth information, making the blurry image be more natural and have hierarchical sense.

The depth information, for example, of the primary image is a space depth range which can be clearly imaged by eyes and which is before and after the focal region, after the shot main part of the primary image is focused. It can be understood that the imaging range before the focal region is the first depth information for the foreground region, and the clear imaging range after the focal region is the second depth information for the background region.

During the blurring process, the block of performing the blurring process with the blurring level on the background region, may be achieved by different modes, which are exampled as follows.

The second depth information comprises depth values for pixels in the background region. As a possible implementation, a blurring coefficient of each pixel is obtained according to the blurring level and the depth value of each pixel in the background region of the target primary image. The blurring level is related to the blurring coefficients for the pixels in the background region. The bigger the blurring coefficient is, the higher the blurring level is. For example, a product, which is obtained by multiplying the blurring level with the depth value of each pixel in the background region of the target primary image, may be calculated to obtain the blurring coefficient of each pixel, and then perform the blurring process for the background region of the target primary image according to the blurring coefficient of each pixel.

As another possible implementation, the second depth information is farer away from the depth information of the focal region, it means the corresponding background region is farer away from the focal region, and is more irrelevant to the focal region, thus the corresponding blurring level is higher. In this exemplary embodiment, the corresponding relation between the blurring level and the difference between the second depth information and the depth information of the focal region may be pre-stored. In the corresponding relation, the difference between the second depth information and the depth information of the focal region is larger, the corresponding blurring level is higher. Thus, the difference between the second depth information of the background region of the target primary image and the depth information of the focal region may be obtained, the corresponding relation is look up to obtain a corresponding blurring level according to the difference thereof, and the blurring process is performed on the background region with the corresponding depth information according to the blurring level.

In this embodiment, the synthesizing-denoising process is performed on the n number of first images and the m number of second images respectively to obtain a primary image and a secondary image respectively, after the primary camera captures the first images and the secondary camera captures second images. Then, depth information of the primary image is obtained based on the primary image and the secondary image, and finally, the blurring process for the primary image is performed based on the depth information of the primary image to obtain the required target image. Since a manner is adopted, in which the primary image is obtained by performing the synthesizing-denoising process on the n number of first images and the secondary image is obtained by performing the synthesizing-denoising process on the m number of second images, the noise in the primary and secondary images is reduced, such that the definition of the primary and secondary images becomes high. The subsequent blurring process is performed on the primary and secondary images with high definition. On the one hand, the imaging effect of the image is improved, and on the other hand, the accuracy of the depth information is improved such that the image-processing effect is good, which solves the technical problem that is the imaging effect after performing the blurring process is poor in the existing technology.

Figure 3A:
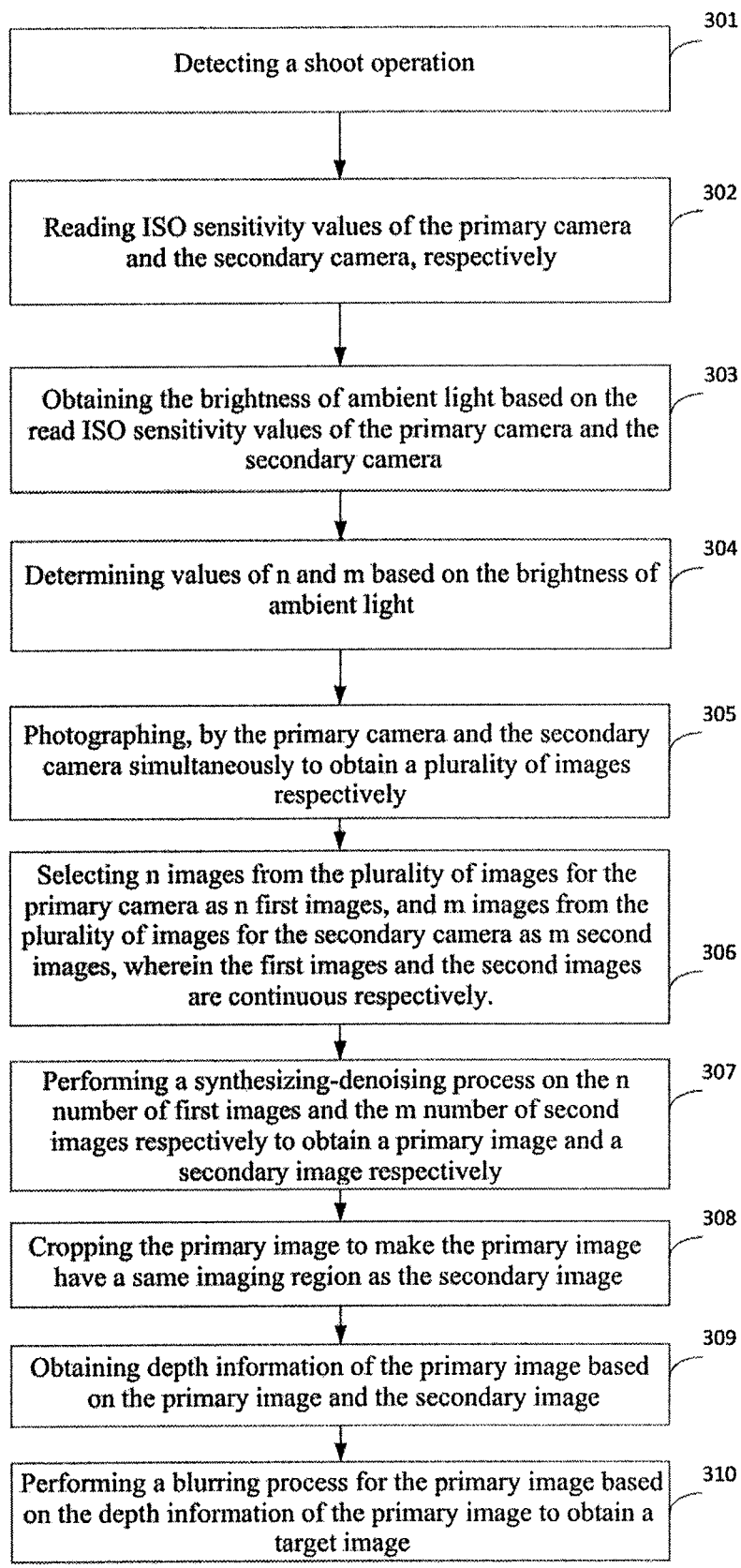
FIG. 3A is a flow chart of another method for image-processing according to an embodiment of the present disclosure.

In order to clearly illustrate the previous embodiment, an embodiment of the present disclosure provides another method for image-processing. FIG. 3A is a flow chart of another method for image-processing according to an embodiment of the present disclosure.

Figure 3B:
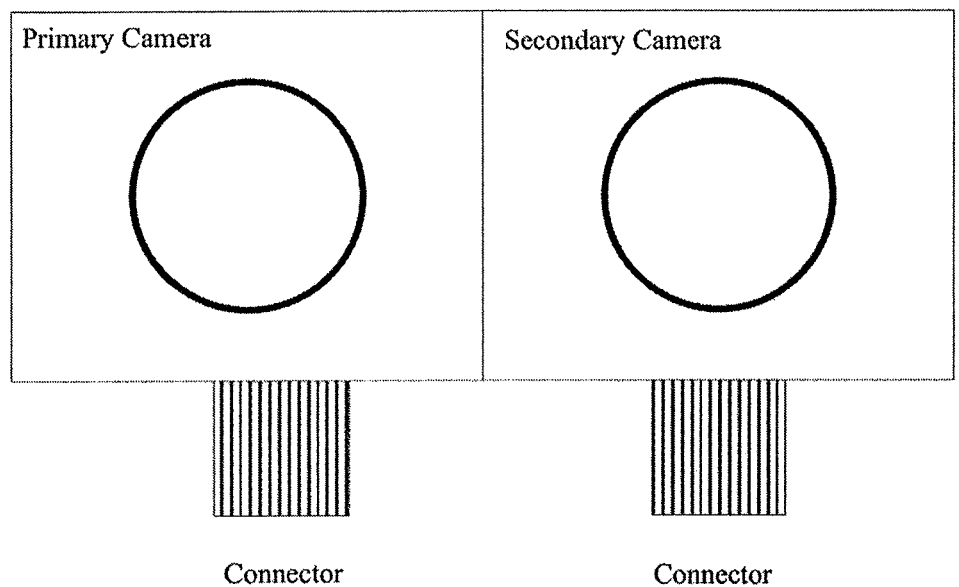
FIG. 3B is a structural schematic view of a camera module.

The method for image-processing, specifically, may be implemented by a hardware apparatus with dual cameras, such as, mobile phone, table PC, personal digital assistant, wearable equipment, etc. The hardware apparatus with dual cameras includes a camera module. FIG. 3B is a structural schematic view of the camera module. As is shown in FIG. 3B, the camera module includes a primary camera and a secondary camera. The primary camera and the secondary camera have a respective lens, an image sensor and a motor, such as a voice coil motor. Both the primary camera and the secondary camera from the dual cameras are connected to a connector respectively. Taking a voice coil motor as an example, the voice coil motors are droved by the current values provided from the connectors, such that the primary camera and the secondary camera are driven by the voice coil motors to adjust a distance between the respective lens and the respective image sensor. Thus, the focus is realized.

As a possible application scenario, the secondary camera has a lower resolution than the primary camera. During the focus, only the secondary camera is configured to be focused for the primary camera and the secondary camera when a shooting operation is detected. A second drive current of the voice coil motor of the secondary camera, which is configured to focus the secondary camera, is read when the secondary camera is focused. A first drive current of the voice coil motor of the primary camera is determined according to the second drive current when the primary camera is required to meet a focusing requirement same to that of the secondary camera. The primary camera is then focused by the first drive current. As the secondary camera has the lower resolution, the speed for image-processing is fast and then the focusing speed is accelerated, which solve the technical problem for low focusing speed for the dual camera in the existing technology.

As shown in FIG. 3B, there is a distance between the primary camera and the secondary camera. As is known from the formula $$Z = \frac{B \cdot f}{X_R - X_T} = \frac{B \cdot f}{d}$$

mentioned in the previous embodiment, if the distance between the primary camera and the secondary camera is too small, computable objects are spaced closely. When the distance for objects is required to be large, the distance between the primary camera and the secondary camera has to be large. However, the distance between the primary camera and the secondary camera is often restricted by a device structure. Therefore, the distance between the primary camera and the secondary camera shall be as large as possible when the hardware apparatus with dual cameras is manufactured and designed.

During a specific implementation of the dual cameras, different groups of cameras may be selected as the primary camera and the secondary camera from the dual cameras. In this way, different users' requirements are to be adapted.

In an embodiment, the secondary camera is one of a regular camera and a dual-pixel camera, and the primary camera is the other of the regular camera and the dual-pixel camera. In an application scenario, it is required that the focusing speed is high. The primary camera from the dual cameras is a regular camera, and the secondary camera from the dual cameras is a dual-pixel camera. The dual-pixel camera has a lower resolution than that of the regular camera.

It should be noted that each pixel of a dual-pixel camera is composed of two units. The two units may be used as phase focus detection points, or combined into an image for a single pixel, which greatly improves the focusing performance when a scene is electronically captured. The dual-pixel complementary metal oxide semiconductor (CMOS) and the sensor camera are commonly used as the dual-pixel camera which uses CMOS as a sensor, which are first used on the SLR camera.

In another embodiment, the secondary camera is one of a wide-angle camera and a telephoto camera, and the primary camera is the other of the wide-angle camera and the telephoto camera. In another application scenario, it is required that the imaging effect is good. The group of a wide-angle camera and a telephoto camera is selected as the dual cameras. The primary camera and the secondary camera are switched to each other due to the shot requirement. For example, when a close scene is needed to be captured, a wide-angle lens is used as the primary camera, and a telephoto lens is used as the secondary camera. When a distant scene is needed to be captured, the telephoto lens is used as the primary camera, and the wide-angle lens is used as the secondary camera. Thus, the optical zoom function is not only realized, but also the imaging quality and the subsequent blurring effect are ensured.

There are many other possible implementations about the selection of the dual cameras, which is not limited herein.

As shown in FIG. 3A, another method for image-processing provided by the embodiment of the present disclosure may be implemented by the above hardware apparatus with the dual cameras. The method may include the following blocks.

At block 301, a shoot operation is detected.

In an embodiment, when a user determines that the image displayed by the preview interface on a mobile terminal is expected, the user may click a shooting widget floating above the preview interface. Then, the mobile terminal detects the shooting operation.

At block 302, ISO sensitivity values of the primary camera and the secondary camera are read respectively.

In an embodiment, the primary camera and the secondary camera shall often adopt a same ISO sensitivity value. A corresponding brightness of ambient light may be determined by the ISO sensitivity value. However, in an embodiment, if the read ISO sensitivity values of the primary camera and the secondary camera are not the same, an average of these ISO sensitivity values of the primary camera and the secondary camera may be determined to be the corresponding brightness of ambient light.

At block 303, the brightness of ambient light is obtained based on the read ISO sensitivity values of the primary camera and the secondary camera.

The ISO sensitivity value is configured to indicate sensitivity of a camera. The ISO sensitivity value is often set to be 50, 100, 200, 400, 1000, etc. The camera may adjust its ISO sensitivity value according to the brightness of ambient light. Thus, in this embodiment, the brightness of ambient light may be derived according to ISO sensitivity value. In a case of high-light environment, the ISO sensitivity value is set to be 50 or 100. In a case of low-light environment, the ISO sensitivity value may be set to be 400 or more.

As a possible implementation, a range for ISO sensitivity values may be divided into several intervals, where each interval corresponds to a level for the brightness of ambient light.

For example, the interval [0,100) corresponds to a high-light level for the brightness of ambient light; the interval [100,400) corresponds to a regular level for the brightness of ambient light; and the interval which is above 400 corresponds to a low-light level for the brightness of ambient light.

At block 304, values of n and m are determined based on the brightness of ambient light. The primary camera captures the n number of first images and the secondary camera captures the m number of second images.

In an embodiment, the number of images on which the synthesizing-denoising process is performed, for example n or m, is determined according to the brightness of ambient light. The higher the brightness of ambient light is, the larger number of images on which the synthesizing-denoising process is performed is. That is, each of the values of the n and the m is in an inverse relationship with the brightness of ambient light.

As a possible implementation, the values of the n and the m are same. The values of the n and the m are in a range from 2 to 6, inclusively.

For example, m=n=6 when the brightness of ambient light is in high-light level; m=n=4 when the brightness of ambient light is in the regular level; and m=n=2 when the brightness of ambient light is in low-light level.

It is noted that the above levels for the brightness of ambient light are merely illustrative, and not intended to be limited. Those skilled in the art should appreciate that, the optimal levels for the brightness of ambient light and values of n and m are determined by finite tests.

At block 305, the primary camera and the secondary camera photograph simultaneously to obtain a plurality of images respectively.

The primary camera and the secondary camera photograph simultaneously, meaning that the secondary camera photographs at the same time the primary camera photographs. Both the primary camera and the secondary camera captures multiple images.

At block 306, n images are selected from the plurality of images for the primary camera as n first images, and m images are selected from the plurality of images for the secondary camera as m second images, wherein the n number of first images and the m number of second images are continuous respectively.

Alternatively, the n first images, which is continuous, are selected from the plurality of images, and the second images, which is continuous, are selected from the plurality of images, based on definition of those images.

It is noted that, when n=m, the selected first images and second images may be obtained by photographing simultaneously, and may also be obtained by photographing un-simultaneously, which is not limited herein.

At block 307, a synthesizing-denoising process is performed on the n number of first images and the m number of second images respectively to obtain a primary image and a secondary image respectively.

The synthesizing-denoising process is described in the previous embodiment, which is not repeated herein.

At block 308, the primary image is cropped to make the primary image have a same imaging region as the secondary image.

In an embodiment, if a field angle of the primary camera is larger than a field angle of the secondary camera, the view range of the primary camera is larger than that of the secondary camera since the primary camera and the secondary camera are located at a same plane. Therefore, it is possible for each object in an image for the primary camera to be not captured by the secondary camera. That is, the object may not exist in the captured image by the secondary camera. In this case, the primary image for the primary camera is required to be cropped to make the primary image have a same imaging region as the secondary image.

It is noted that, if a field angle of the primary camera is less than or equal to a field angle of the secondary camera, the view range of the primary camera is less than or equal to that of the secondary camera since the primary camera and the secondary camera are located at a same plane. Therefore, it is possible for each object in an image for the primary camera to be located at an image for the secondary camera, without considering the blind area. That is, the object may exist in the captured image by the secondary camera at the same time. In this case, the primary image for the primary camera isn't required to be cropped.

At block 309, depth information of the primary image is obtained based on the primary image and the secondary image.

In an embodiment, depth information of each object in the primary image is obtained according to the position deviation between an object in the primary image and the same object in the secondary image, and parameters of the dual cameras, after the primary image and the secondary image are the registered. The depth information of the primary image is obtained as depth information of all objects in the primary image is obtained.

At block 310, a blurring process for the primary image is performed based on the depth information of the primary image to obtain a target image.

After obtaining depth information of the primary image, a background region and a foreground region are identified on the primary image based on the depth information. For example, whether one object on the primary image belongs to foreground region or background region according to depth information of the object in the primary image. Generally, the depth information of one object indicates that the object is determined to belong to the foreground region when a depth value for the object is small as the object close to the plane where the primary and secondary cameras are located. Otherwise, the object may be determined to belong to the foreground region. The blurring process may be performed on the background region to obtain the target image.

In this embodiment, the synthesizing-denoising process is performed on the n number of first images and the m number of second images respectively to obtain a primary image and a secondary image respectively, after the primary camera captures the first images and the secondary camera captures second images. Then, depth information of the primary image is obtained based on the primary image and the secondary image, and finally, the blurring process for the primary image is performed based on the depth information of the primary image to obtain the required target image. Since a manner is adopted, in which the primary image is obtained by performing a synthesizing-denoising process on the n number of first images and the secondary image is obtained by performing a synthesizing-denoising process on the m number of second images, the noise in the primary and secondary images is reduced, which solves the technical problem that is the imaging effect after performing the blurring process is poor in the existing technology.

In order to implement the above embodiments, an apparatus for image-processing is provided in the present disclosure.

Figure 4:
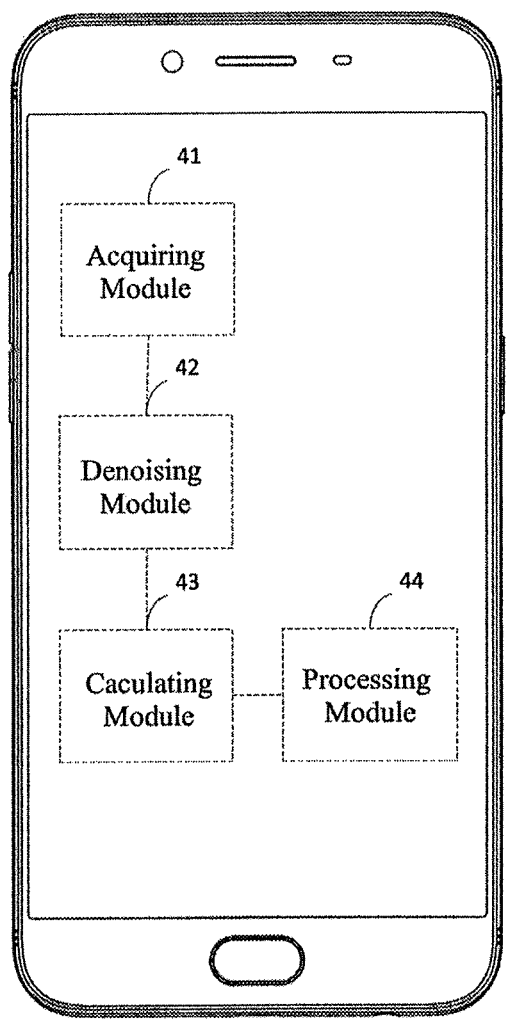
FIG. 4 is a structural schematic view of an apparatus for image-processing according to an embodiment of the present disclosure.

FIG. 4 is a structural schematic view of an apparatus for image-processing according to an embodiment of the present disclosure. The apparatus may be applied to a mobile terminal.

As shown in FIG. 4, the apparatus includes an acquiring module 41, a denoising module 42, a calculating module 43 and a processing module 44.

The acquiring module 41 is configured to acquire n number of first images and m number of second images, wherein the first images and the second images are captured by a primary camera and a secondary camera respectively. Both n and m are integers greater than 2.

Specifically, the acquiring module 41 is configured to photograph simultaneously to obtain a plurality of images respectively when a shoot operation is detected, select n images from the plurality of images for the primary camera as n first images and select m images from the plurality of images for the secondary camera as m second images, wherein the n number of first images and the m number of second images are continuous respectively.

The denoising module 42 is configured to perform a synthesizing-denoising process on the n number of first images and the m number of second images respectively to obtain a primary image and a secondary image respectively.

The calculating module 43 is configured to obtain depth information of the primary image based on the primary image and the secondary image.

The processing module 44 is configured to perform a blurring process for the primary image based on the depth information of the primary image to obtain a required target image.

Figure 5:
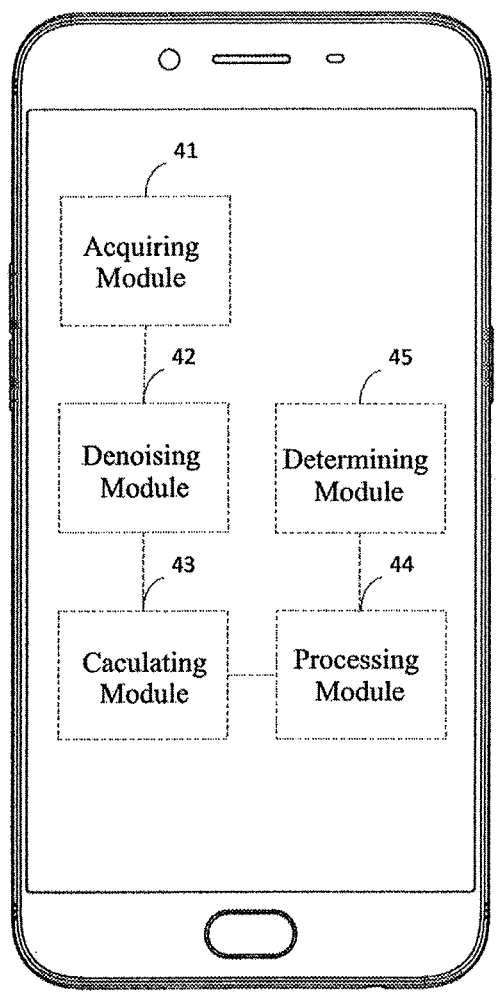
FIG. 5 is a structural schematic view of another apparatus for image-processing according to an embodiment of the present disclosure.

Another apparatus for image-processing is provided in an embodiment of the present disclosure. As shown in FIG. 5, which is based on FIG. 4, the apparatus also includes a determining module 45.

The determining module 45 is configured to determine brightness of ambient light, and then determine values of n and m based on the brightness of ambient light.

Each of the values of the n and the m is in an inverse relationship with the brightness of ambient light. Alternatively, the values of the n and the m are same. The values of the n and the m are in a range from 2 to 6, inclusively.

Specifically, the determining module 45 is configured to read ISO sensitivity values of the primary camera and the secondary camera, respectively, and obtain the brightness of ambient light based on the read ISO sensitivity values of the primary camera and the secondary camera.

In this embodiment, the synthesizing-denoising process is performed on the n number of first images and the m number of second images respectively to obtain a primary image and a secondary image respectively, after the primary camera captures the first images and the secondary camera captures second images. Then, depth information of the primary image is obtained based on the primary image and the secondary image, and finally, the blurring process for the primary image is performed based on the depth information of the primary image to obtain the required target image. Since a manner is adopted, in which the primary image is obtained by performing a synthesizing-denoising process on the n number of first images and the secondary image is obtained by performing a synthesizing-denoising process on the m number of second images, the noise in the images is reduced, which solves the technical problem that is the imaging effect after performing the blurring process is poor in the existing technology.

It should be noted that, the above descriptions for the methods in the above embodiments, are also appropriate for the apparatus of the exemplary embodiment of the present disclosure, which will be not described herein.

Figure 6:
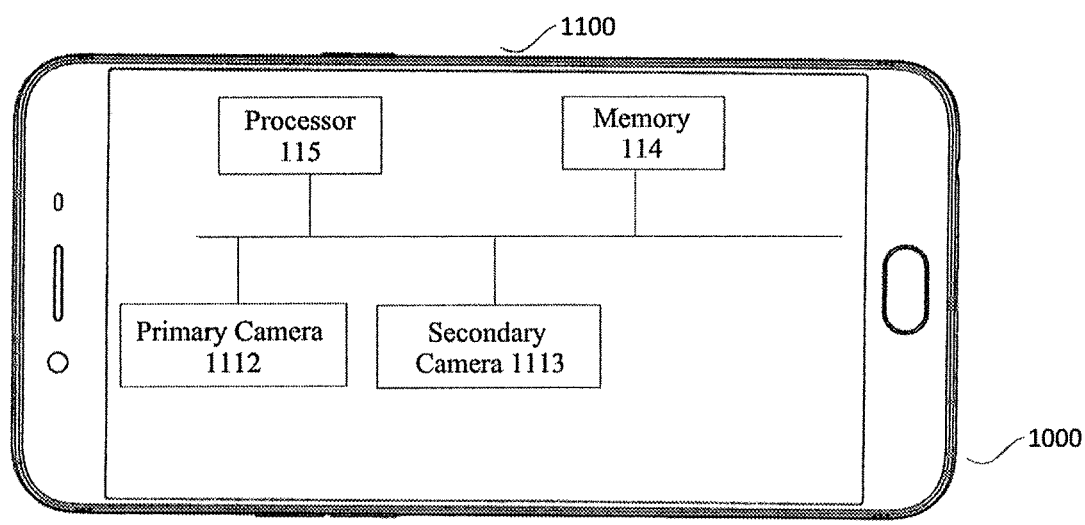
FIG. 6 is a structural schematic view of a mobile terminal according to an embodiment of the present disclosure.

To achieve the above embodiments, the present disclosure further provides a mobile terminal. FIG. 6 is a structural schematic view of a mobile terminal according to an embodiment of the present disclosure. As shown in FIG. 6, the mobile terminal includes a housing 1100 and a primary camera 1112, a secondary camera 1113, a memory 1114 and a processor 1115 which are arranged in the housing 1100.

The memory 1114 is configured to store executable program instructions. The processor 1115 is configured to read the executable program instructions in the memory 1114 to implement a procedure corresponding to the executable program instructions, so as to perform the methods for image-processing based on the dual cameras in previous embodiments.

A field angle of the primary camera 1112 may be less than or equal to a field angle of the secondary camera 1113. Thus, the imaging region of the primary camera 1112 is contained in the imaging region of the secondary camera 1113. The depth information of main part for the primary camera 1112 is then calculated.

To achieve the above embodiments, the present disclosure further provides a nonvolatile computer-readable memory medium, when instructions stored in the memory medium run in a processor of a mobile terminal, the method for image-processing of the above embodiments is implemented.

Figure 7:
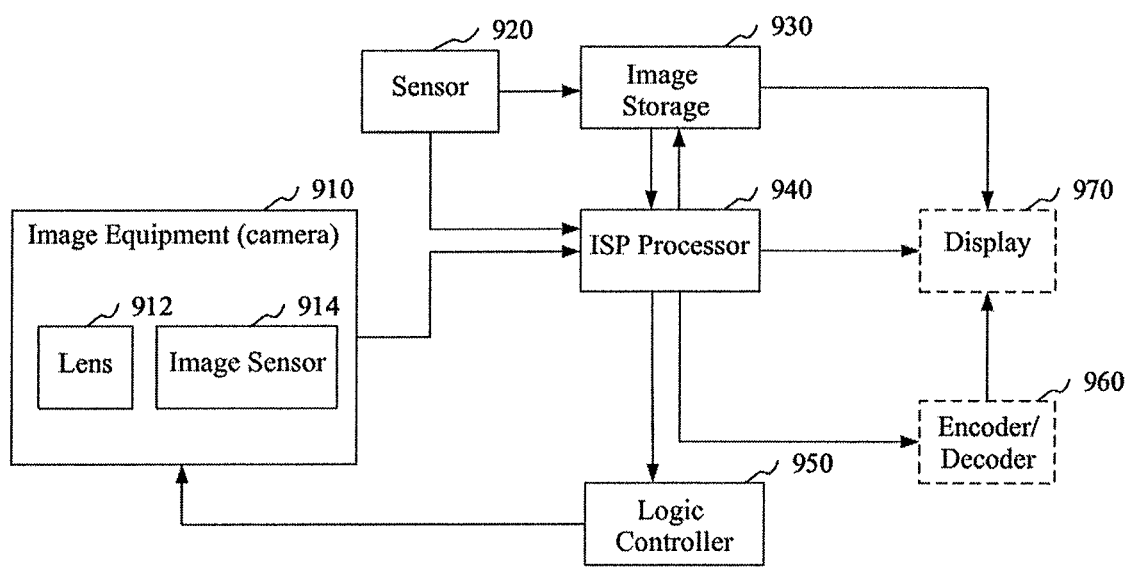
FIG. 7 is a schematic view of an image-processing circuit according to an embodiment of the present disclosure.

The above mobile terminal also includes an image-processing circuit, which may be achieved by a hardware or software component and include various processing units with ISP (Image Signal Processing) pipelines. FIG. 7 is a schematic view of an image-processing circuit according to an embodiment of the present disclosure. As shown in FIG. 7, to convenient for describing, it only shows components related to the image-processing technology in embodiments of the present disclosure.

As shown in FIG. 7, the image-processing circuit includes an ISP processor 940 and a logic controller 950. Image data captured by an image equipment 910 is firstly processed by the ISP processor 940. The ISP processor 940 analyzes the image data to capture image statistical information which are configured to determine one or more control parameter of the image equipment 910. The image equipment 910 includes dual cameras, which are a primary camera and a secondary camera. Each camera includes one or more lens 912 and an image sensor 914. The image sensor 914 may include a color filter array (such as, Bayer filter). The image sensor 914 may obtain light intensity and wavelength information captured by each image pixel of the image sensor 914, and provide original image data which should be processed by the ISP processor 940. The sensor 920 may provide the original image data to the ISP processor 940 according to the type of an interface of the sensor 920. The interface of the sensor 920 may be a SMIA (Standard Mobile Imaging Architecture) interface, a serial or parallel camera interface, or a combination of the above interfaces.

The ISP processor 940 may process the original image data pixel by pixel in a variety of formats. For example, each image pixel may have a bit depth with 8, 10, 12 or 14 bits, and the ISP processor 940 may perform one or more image-processing operations for the original image data, and collect the statistical information of the image data. The image-processing operations may be performed according to a same bit depth or different bit depths.

The ISP processor 940 may further receive pixel data from an image storage 930. For example, original pixel data may be transmitted to the image storage 930 via the interface of the image sensor 914, and then the original pixel data stored in the image storage 930 is transmitted to the ISP processor 940 for being processed. The image storage 930 may be a part of a storing device, or an independent special storage in a storage device or an electronic device, and have a DMA (Direct Memory Access) property.

When receiving the original image data from the interface of the image sensor 920 or the image storage 930, the ISP processor 940 may perform the one or more image-processing operation, such as a time domain filtering operation. The processed image data may be transmitted to the image storage 930 for performing other process before being displayed. The ISP processor 940 receives the processed data from the image storage 930, and then perform an image-processing operation of the primitive domain and the RGB and YCbCr color space for the processed data, thus the processed data may be transmitted to a display 970 for being viewed by viewers and/or being further processed by a graphics engine or a GPU (Graphics Processing Unit). In addition, the output of the ISP processor 940 may be transmitted to the image storage 930, and the display 970 may read the image data from the image storage 930. In an exemplary embodiment, the image storage 930 may be configured to include one or more frame buffer. In addition, the output of the ISP processor 940 may be sent to an encoder/decoder 960, for encoding/decoding the image data. The encoded image data may be stored and be decoded before displaying in the display 970. The encoder/decoder 960 may be achieved by a CPU, or a GPU, or a coprocessor.

The statistical data determined by the ISP processor 940, may be transmitted to the logic controller 950. For example, the statistical data may be statistical information of the image sensor 940 relevant to automatic exposure, automatic white balance, automatic focus, flicker detection, black level compensation, shadow correction of the lens 912, etc. The logic controller 950 may include a CPU or a microcontroller for performing one or more thread, and the one or more thread may determine control parameters of the image equipment 910 according to the received statistical data. For example, the control parameters may include control parameters of the image sensor 914 (such as, a grain, an integral time of exposure controlling), flicker control parameters of the camera, control parameters of the lens 912 (such as, a focal length of focusing or zooming), or combinations of these parameters. ISP control parameters may include a gain for automatic white balance and color adjusting (such as, in a duration of RGB processing), a color correction matrix, and a shadow correction parameter of the lens 912.

In the description of this specification, reference terms "one embodiment", "some embodiments", "example", "specific example", or "some examples" in connection with the embodiment or example are described by specific features, the structure, material, or characteristic which is included in one embodiment of the disclosure or examples in this specification. The schematic representations of the terms are not necessarily to the same embodiment or example. Furthermore, the particular features, structures, the material, or characteristics may be any one or more of the embodiments or examples combined in a suitable manner. In addition, in the case of not mutually inconsistent, persons skilled in the art can combine or assemble different embodiments or examples.

In addition, the terms "first" and "second" are used for descriptive purposes only, and should not be taken to indicate or imply relative importance or implicitly indicate the number of technical features. Thus, defining features "first" and "second" may explicitly or implicitly include at least one of the features. In the description of the present disclosure, a "plurality" means at least two, for example, two or three, unless clearly specifically defined.

Flowchart diagrams, any processes or methods described by different manners can be understood that units, fragments or portions of executable instruction codes for implementing specific logical functions or steps. Persons skilled in related art should be noted that the embodiments of the present disclosure can be implemented in a substantially simultaneous manner or in a reverse order to perform functions.

Logic units and actions at blocks in the flowchart are defined as a sequence table of executable instructions for implementing logical functions. The sequence table of executable instructions can be embodied in any computer-readable medium for an instruction execution system, an apparatus, or a device (e.g., computer-based system, a system having a processor, or an instruction execution system, an apparatus, or a device to access the instructions and execute the instructions). In the present disclosure, "computer-readable medium" can include of storage, communication, propagation, transmission programs or the combinations. The "computer-readable medium" includes at least one of electrical wired connection portion (e.g., an electronic devices), a portable computer diskette (e.g., a magnetic device), a random access memory (RAM), a read-only memory (ROM), erasable programmable read-only memory (e.g., EPROM or flash memory), fiber optic devices, and a portable compact disc read-only memory (e.g., CDROM). In addition, the computer-readable medium can even be paper or suitable medium on which the programs are printed. For example, the paper or suitable medium are optically scanned. The programs on the paper or suitable medium are electronically obtained using compiled and interpreted manners and stored in computerized memory.

It should be understood that portions of the present disclosure may be implemented in hardware, software, firmware, or combinations thereof. In the above-described embodiments, a plurality of actions or methods may be stored in a memory and are executed by software or firmware implemented in a suitable instruction execution system. If actions at the blocks or methods may be implemented, for example, in hardware, as in another embodiment, any one of the following techniques or combinations thereof in the related art may be used. The techniques include a discrete logic circuit of logic gate circuits to implement logic functions on data signals, an application specific integrated circuit having appropriate combinational logic gate circuits, a programmable gate array (PGA), and a field programmable gate array (FPGA).

Persons skilled in the related art should be noted that all or part of actions in the above-described embodiments can be implemented by program instructions executable in hardware. The program instructions are stored in computer-readable medium and the program instructions are performed for at least one of actions at the blocks.

Furthermore, each of functional units may be integrated in one processing unit or be a separate physical unit. For example, two or more units are integrated in a single unit. The integrated units can be implemented in a form of hardware or software unit. In one embodiment, when the integrated units are implemented in the form of a software unit which is sold or used as an independent product, the integrated units can be stored in a computer-readable storage medium.

The computer-readable storage medium can be a read-only memory, a magnetic disk or optical disk. As is understood by a person skilled in the art, the foregoing preferred embodiments of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. A method for image processing, comprising:
   selecting n number of first images captured by a primary camera in response to a shooting operation and m number of second images captured by a secondary camera in response to the shooting operation, wherein both the n and the m are integers greater than 2;
   performing a synthesizing-denoising process on the n number of first images and the m number of second images respectively to obtain a primary image and a secondary image respectively;
   obtaining depth information of the primary image based on the primary image and the secondary image; and
   performing a blurring process for the primary image based on the depth information of the primary image to obtain a target image;
   wherein the primary camera and the secondary camera each have a focusing motor, the secondary camera has a lower resolution than the primary camera, and the secondary camera is configured to be focused for the primary camera and the secondary camera; and wherein the primary camera is configured to be focused by reading a second drive current of the focusing motor of the secondary camera during focusing of the secondary camera, determining a first drive current of the focusing motor of the primary camera according to the second drive current such that a focusing requirement of the primary camera matches a focusing requirement of the secondary camera, and focusing the primary camera by the first drive current.

2. The method of claim 1, further comprising:
obtaining brightness of ambient light; and
determining values of n and the m based on the brightness of ambient light;
wherein each of the values of n and the m is in an inverse relationship with the brightness of ambient light.

3. The method of claim 2, wherein the obtaining the brightness of ambient light comprises:
reading ISO sensitivity values of the primary camera and the secondary camera respectively; and
obtaining the brightness of ambient light based on the ISO sensitivity value of the primary camera and the ISO sensitivity value of the secondary camera.

4. The method of claim 1, wherein a field angle of the primary camera is larger than a field angle of the secondary camera; and
before obtaining the depth information of the primary image based on the primary image and the secondary image, the method further comprises:
cropping the primary image to make the primary image have a same imaging region as the secondary image.

5. The method of claim 1, wherein the performing the blurring process for the primary image comprises:
identifying a background region and a foreground region on the primary image based on the depth information; and
performing the blurring process on the background region.

6. The method of claim 5, wherein the depth information comprises first depth information for the foreground region and second depth information for the background region; and
the performing the blurring process on the background region comprises:
calculating a blurring level based on the first depth information and the second depth information; and
performing the blurring process with the blurring level on the background region.

7. The method of claim 6, wherein the second depth information comprises depth values for pixels in the background region; and
the blurring level is related to blurring coefficients for the pixels in the background region, wherein a blurring coefficient for each pixel is calculated based on the blurring level and a depth value for each pixel.

8. The method of claim 7, wherein the blurring coefficient for each pixel in the background region is a product obtained by multiplying the blurring level by the depth value for each pixel.

9. The method of claim 6, wherein
the blurring level is related to differences between the second depth information and a depth information for a focal region of the primary camera.

10. The method of claim 1, wherein the secondary camera is one of a regular camera and a dual-pixel camera, and the primary camera is the other of the regular camera and the dual-pixel camera.

11. The method of claim 1, wherein the secondary camera is one of a wide-angle camera and a telephoto camera, and the primary camera is the other of the wide-angle camera and the telephoto camera.

12. The method of claim 1, wherein the selecting the n number of first images and the m number of second images comprises:
photographing, by the primary camera and the secondary camera simultaneously, to obtain the n number of first images and the m number of second images respectively, wherein the n number of first images and the m number of second images are continuous respectively.

13. The method of claim 1, wherein both the primary camera and the secondary camera are arranged in a mobile terminal.

14. The method of claim 13, wherein the mobile terminal is a smartphone, a wearable device, a personal digital assistant or a tablet computer.

15. A mobile terminal, comprising circuitry configured to:
select n number of first images captured by a primary camera in response to a shooting operation and m number of second images captured by a secondary camera in response to the shooting operation;
perform a synthesizing-denoising process on the n number of first images and the m number of second images respectively to obtain a primary image and a secondary image respectively;
obtain depth information of the primary image based on the primary image and the secondary image; and
perform a blurring process for the primary image based on the depth information of the primary image to obtain a target image;
wherein the primary camera and the secondary camera each have a focusing motor, the secondary camera has a lower resolution than the primary camera, and the secondary camera is configured to be focused for the primary camera and the secondary camera; and
wherein the primary camera is configured to be focused by reading a second drive current of the focusing motor of the secondary camera during focusing of the secondary camera, determining a first drive current of the focusing motor of the primary camera according to the second drive current such that a focusing requirement of the primary camera matches a focusing requirement of the secondary camera, and focusing the primary camera by the first drive current.

16. The mobile terminal of claim 15, wherein a field angle of the primary camera is larger than a field angle of the secondary camera.

17. A non-transitory computer readable medium storing instructions which, when executed by a processor, cause the processor to perform a method for image processing, the method comprising:
selecting n number of first images captured by a primary camera in response to a shooting operation and m number of second images captured by a secondary camera in response to the shooting operation;
performing a synthesizing-denoising process on the n number of first images and the m number of second images respectively to obtain a primary image and a secondary image respectively;
obtaining depth information of the primary image based on the primary image and the secondary image; and
performing a blurring process for the primary image based on the depth information of the primary image to obtain a target image;

wherein the primary camera and the secondary camera each have a focusing motor, the secondary camera has a lower resolution than the primary camera, and the secondary camera is configured to be focused for the primary camera and the secondary camera; and wherein the primary camera is configured to be focused by reading a second drive current of the focusing motor of the secondary camera during focusing of the secondary camera, determining a first drive current of the focusing motor of the primary camera according to the second drive current such that a focusing requirement of the primary camera matches a focusing requirement of the secondary camera, and focusing the primary camera by the first drive current.

* * * * *